United States Patent [19]

Bayer et al.

[11] Patent Number: 4,547,738
[45] Date of Patent: Oct. 15, 1985

[54] PHASE SHIFT DEMODULATOR

[75] Inventors: Robert S. Bayer, West Milford; Mark A. Petronaci, Rockaway, both of N.J.

[73] Assignee: American Standard Inc., New York, N.Y.

[21] Appl. No.: 503,036

[22] Filed: Jun. 10, 1983

[51] Int. Cl.$^4$ ............................................. H03K 9/04
[52] U.S. Cl. ..................................... 329/107; 329/50; 329/124; 375/82; 375/85
[58] Field of Search ................. 329/107, 122, 124, 50; 375/53, 54, 82, 84, 85, 86, 94, 95, 114, 116

[56] References Cited

U.S. PATENT DOCUMENTS

| | | | |
|---|---|---|---|
| 3,335,369 | 8/1967 | Priebe | 375/52 |
| 3,798,561 | 3/1974 | Bocker | 375/84 X |
| 3,924,186 | 12/1975 | Gordy et al. | 375/54 |
| 4,017,803 | 4/1977 | Baker | 329/50 X |
| 4,201,884 | 5/1980 | Couch et al. | 375/86 X |
| 4,287,596 | 9/1981 | Chari | 375/49 |
| 4,320,345 | 3/1982 | Waggener | 329/50 |
| 4,344,041 | 8/1982 | Maine | 329/50 |
| 4,361,895 | 11/1982 | Khoudari | 375/94 X |
| 4,456,884 | 6/1984 | Yarborough, Jr. | 329/107 X |

FOREIGN PATENT DOCUMENTS

| | | | |
|---|---|---|---|
| 0064849 | 4/1983 | Japan | 375/114 |
| 1281169 | 7/1972 | United Kingdom | 375/54 |

Primary Examiner—Eugene R. LaRoche
Assistant Examiner—Robert J. Pascal
Attorney, Agent, or Firm—Wood, Herron & Evans

[57] ABSTRACT

A quadrature demodulator for a phase shifted input pulse signal. The demodulator produces a four state digital code word on two output lines dependent upon the phase of the input signal. The input signal may have a phase shift, from the phase of the carrier signal, of zero degrees, +90°, −90°, or 180°. The demodulator includes a clock-driven counter having an output signal at a fundamental frequency substantially identical to the carrier frequency of the input pulse signal. The counter produces additional output signals at frequencies which are multiples of the carrier frequency. The counter is synchronized with the input signal during a reference interval of zero phase shift, and a strobe circuit combines the various counter outputs to produce strobe signals to detect the phase shifted input signal. The strobe signals are used to clock a pair of flip-flops which each receive the input signal at a data input, with the Q outputs of the flip-flops providing the pair of output lines which indicate the four states of the digital code word.

9 Claims, 3 Drawing Figures

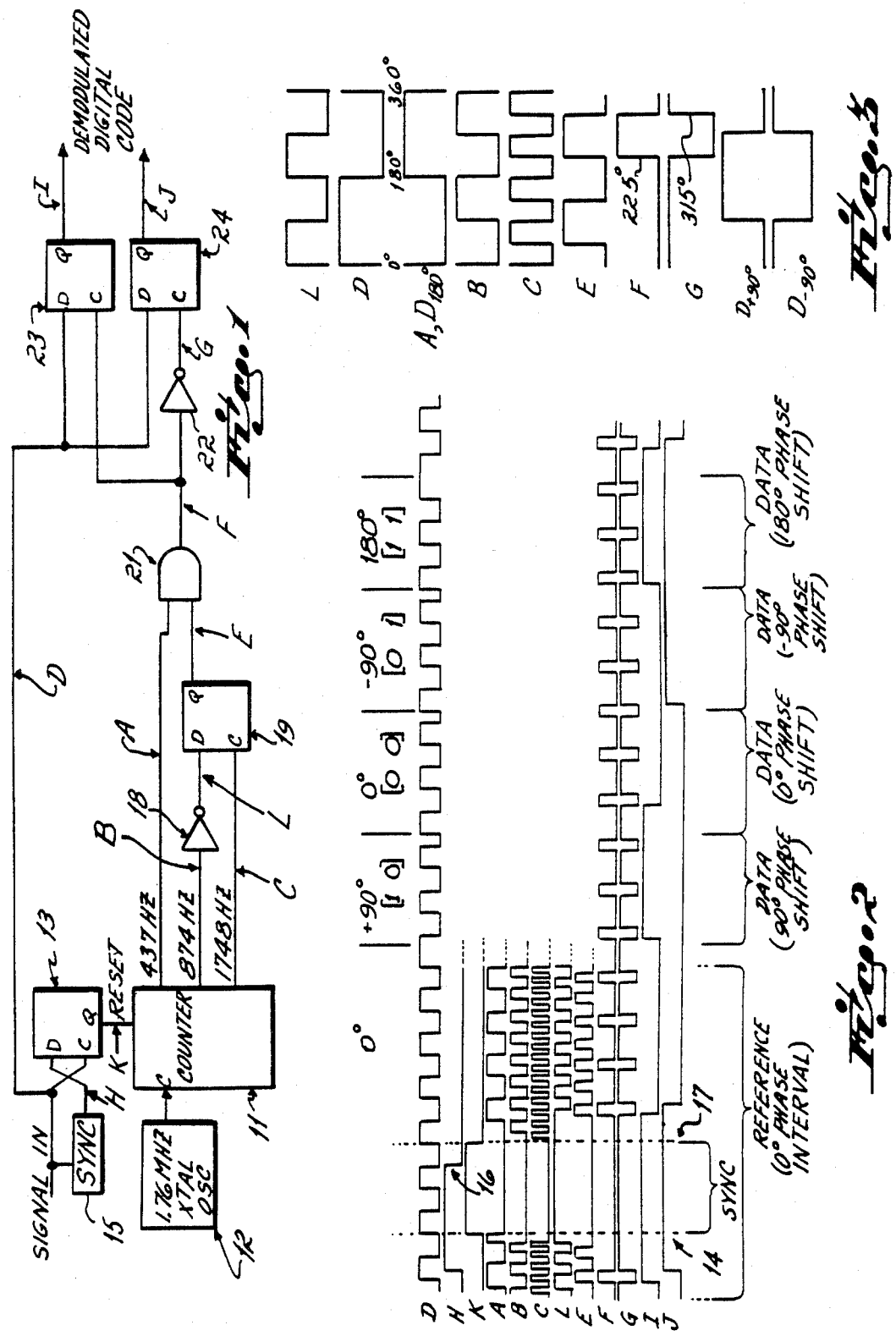

4,547,738

PHASE SHIFT DEMODULATOR

DESCRIPTION OF THE INVENTION

This invention relates generally to demodulators and more particularly concerns a pulse signal phase shift demodulator utilizing a clock-driven counter synchronized with the signal to be demodulated.

A number of applications exist in which data is transmitted over communication lines using phase shift modulation and demodulation. Illustrative of an application in which this is done is the transmission of secure/alarm status information from a local premise to a remote monitoring location and the return transmission of information from the remote location. In one such system, a carrier at a given frequency and phase is transmitted from one location to the other, with three discrete phase shifted representations of the carrier signal being alternatively switched onto and off of the transmission path as a function of a code to be represented. In this system, a digital code sequence is transmitted and received which is represented by four state digital words. For example, a pulse signal having no phase shift may represent a first state, a positive phase shift of 90°, a second state, a negative phase shift of 90°, a third state, and a phase shift of 180°, a fourth state.

In such a system, a demodulator is typically provided at each of the two locations and must be capable of properly demodulating the digital data from the input signal which is received from the transmitter at the other location. It is necessary with such a demodulator to synchronize the demodulator with the input pulse signal frequency and phase, without the use of transmitted sync pulses, it order to properly detect the positive and negative phase shifting of the input signal.

It is the general aim of the invention to provide a phase shift demodulator for systems of the foregoing type which may be easily synchronized with the incoming pulse signal and which is reliable and relatively inexpensive.

In the illustrated embodiment of the invention, the phase shift demodulator takes the form of a clock-driven counter having several outputs (one of which substantially matches the input pulse signal frequency), a logic circuit for synchronizing the counter with the input signal, a second logic circuit for developing strobe signals from the counter outputs, and an output circuit responsive to the strobe signals and coupled to the input pulse signal to produce a demodulated digital code output.

Other objects and advantages of the invention, and the manner of their implementation, will become apparent upon reading the following detailed description and upon reference to the drawings, in which:

FIG. 1 is a circuit diagram of a demodulator constructed in accordance with the present invention;

FIG. 2 is a series of waveforms taken at various points in the circuit diagram of FIG. 1; and FIG. 3 is an expanded representation of certain of the waveforms of FIG. 2.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention as defined by the appended claims.

With reference now to the figures, the input signal D is a pulse waveform varying between a logic one and a logic zero at an exemplary frequency of 436 Hz. The input pulse signal may be formed, for example, by bandpassing a signal from the transmission line and converting it to a square wave signal for demodulation. A counter 11 of the demodulator receives a 1.76 MHz. clocking signal from an oscillator 12 and produces three outputs which are used in the demodulator. An output A at 437 Hz. is substantially identical to the frequency of the input signal. Additional outputs B and C are at twice and four times the input signal frequency, respectively. In order to demodulate the incoming signal D, the counter 11 is synchronized with the input signal, and the outputs A, B and C are used to produce strobe pulses. The strobe pulses permit the demodulator to sample the incoming signal at appropriate times in each cycle to determine the phase shift for each word in a transmitted sequence of words.

In order to synchronized the counter 11 with the input pulse signal, the input signal is coupled to the clock input of a flip-flop 13. A sync pulse, which is produced by a sync circuit 15, is coupled to the data input of the flip-flop 13, and the Q output of the flip-flop is connected to the reset terminal of the counter 11.

In the illustrated system, the input pulse signal carries data in the form of a sequence of eight four-state words of digital code, preceded by a reference interval and a start word. The code sequences are separated from one another by intervals during which no pulses are transmitted. The sync circuit 15 is coupled to the input pulse signal and detects the intervals between code sequences during which no pulses are produced. When the input pulse signal returns to a pulse condition, the sync circuit 15 recognizes this as the reference phase for another data sequence and, after a certain interval, produces a sync pulse, which is coupled to the data input of the flip-flop 13. Therefore, the sync pulse occurs during the reference phase at the beginning of a data sequence.

With reference to the waveforms in FIG. 2, when the sync pulse H is applied to the flip-flop 13, on the next rising edge of the input signal D, a reset K is applied to the counter 11. This occurs at the time indicated 14 in the waveforms. The counter 11 is held in the reset condition while the sync pulse is applied, with no output pulses A, B or C being produced.

The sync pulse H is then removed, asynchronously relative to the input pulse signal. The duration of the sync pulse is not critical, with a duration of a few cycles of the input pulse signal, as illustrated in FIG. 2, being satisfactory. After the syncpulse is removed, on the next rising edge of the input pulse signal (which is clocking the flip-flop 13), at the time 17, the reset is removed from the counter 11. The counter 11 therefore begins counting at the rising edge of an input pulse, and the signals A and D, being at substantially the same frequency, maintain a fixed 180° phase differential for the remainder of the digital code sequence.

To produce the strobe signals for demodulating the digital code of the input pulse signal, the three counter outputs A, B and C are coupled through logic circuitry to produce strobe pulse signals F and G. The signal at twice the input frequency, the signal B, is inverted by an inverter 18 and applied to the data input of a flip-flop 19. The flip-flop 19 is clocked by the signal C, which is at four times the input frequency. The resulting Q output of the flip-flop 19, the signal E, is at the double input frequency of the signal B, but phase shifted by −45°. This is one input to an AND gate 21, and the other AND gate input is the waveform A from the counter 11. The output of the AND gate 21 is the waveform F, which is a pulse waveform occurring at the same frequency as that of the input pulse signal. The signal F serves as one strobe pulse for demodulating the digital code from the input pulse signal. The waveform F is also inverted by an inverter 22 to form the pulse waveform G, which serves as a second strobe pulse for demodulating the digital code.

The digital input signal D has a zero phase shift during a reference interval, and has one of four possible phases during successive code intervals, to designate for each interval a digital word having one of four states. With the states defined by two-bit binary words, the states for each of the four phases are: (0 0) for 0°, (1 0) for +90°, (0 1) for −90°, and (1 1) for 180°. The strobe signal F is used to clock a flip-flop 23, which produces a logic one in the event of a +90° or 180° phase shift. In order to do this, the input pulse signal D is coupled to the data input of the flip-flop 23. Through the action of the strobe pulse at the clock input of the flip-flop 23, this produces a demodulated digital code signal on the line I, which is a logic one if the input pulse signal is shifted +90° or 180°.

Similarly, the strobe signal G is used to clock a flip-flop 24 to produce a logic one in the event of a −90° or 180° phase shift. To do this, the input pulse signal D is coupled to the data input of the flip-flop 24, and through the action of the strobe pulse at the clock input of the flip-flop 24, a logic one is produced on the Q output line J of the flip-flop 24 in the event of a −90° or 180° phase shift.

The two lines I and J therefore contain a demodulated digital code word indicative of one of four states, as defined above, for the four possible phases for the input pulse signal. The demodulated digital code on the pair of lines I and J may then be used by subsequent circuitry at the location of the demodulator. For example, the code may be accumulated in a register and read by a microprocessor.

The timing relationships of the strobe signals for the illustrated form of the invention are best seen in FIG. 3. For reference, the rising edge of a pulse in a cycle of the input pulse signal D, with zero phase shift, is designated as zero degrees. The strobe pulses F and G clock the flip-flops 23, 24 on the respective rising edges of the strobe pulses. Therefore, the strobe pulse F is effective at 225°, and the strobe pulse G is effective at 315°. As shown in FIG. 3, when the input signal D has zero degrees phase shift, both of the flip-flops 23, 24 are strobed when the input signal is at a logic zero. This produces an output state of (0 0) on the output lines I and J.

If the input pulse signal is shifted so that it has a +90° phase, however, the strobe pulse F occurs when the input signal is at a logic one, which is clocked through the flip-flop 23 to the output line I. With a +90° phase shift, the strobe pulse G occurs when the input signal is at a logic zero, and therefore a digital word (1 0) is produced at the output.

If there is a −90° phase shift of the input pulse signal, the strobe pulse F occurs during a logic zero, and the strobe pulse G occurs during a logic one of the input signal. This produces a digital output word of (0 1).

Finally, if the input pulse signal is shifted 180°, the strobe pulses F and G each occur during a logic one of the input pulse signal, and a logic word (1 1) is produced at the output.

In the present instance, a sequence of digital code begins with a start word following the initial reference interval. In this case, the start word is (1 0). This first data word, the start word, is then followed by eight data words, each having one of the four possible states, to make up one complete digital code transmission. The particular format of the data code transmission is, however, not critical to the invention, and other, longer or shorter, data word configurations can be used.

In the illustrated form of the invention, the counter 11 is a type CD 4040 integrated circuit, and the flip-flops are "D"-type flip-flops designated CD 4013. While the invention has been described in connection with specific logic circuitry, it will be understood that numerous changes and modifications may be made without departing from the spirit and scope of the invention. For example, negative logic gates could be utilized in the circuit of FIG. 1 rather than the positive logic gates illustrated.

WHAT IS CLAIMED IS:

1. A phase shift demodulator for demodulating an input pulse signal comprising pulses occurring at a given frequency, phase shift modulated with sequences of digital code words, comprising:

a clock-driven counter having a plurality of pulse signal outputs of differing frequencies, one of which corresponds substantially to said given frequency of the modulated input pulse signal;

means for synchronizing the pulse signal outputs of the counter with the unmodulated phase of the input pulse signal at the beginning of a sequence of digital code words which modulate said given frequency of the input pulse signal;

strobe means, coupled to said plurality of counter outputs, for combining said plurality of counter outputs to produce a strobe signal output, differing from each counter output of said plurality of counter outputs, including a strobe signal for each word in a sequence of digital code words modulating said given frequency of the input pulse signal; and output means, coupled to the strobe signal output and to the input pulse signal, for producing sequences of demodulated digital code words based upon the condition of the input pulse signal when each said strobe signal is produced.

2. The demodulator of claim 1 in which the counter includes a reset input and is responsive to a reset signal at the reset input to inhibit the counter pulse signal outputs, and in which the means for synchronizing further includes means for (a) coupling a reset signal to said reset input of the counter prior to the beginning of a sequence of digital code words in the input pulse signal and for (b) subsequently removing the reset signal from said reset input of the counter before the beginning of the sequence of digital code in the input pulse signal, when the input pulse signal is at a particular phase.

3. The demodulator of claim 2 in which the means for synchronizing further includes means, coupled to the input pulse signal and responsive thereto, for producing a sync pulse at a sync pulse output before the beginning of a sequence of digital code words in the input pulse signal, and in which the means for coupling and removing the counter reset pulse comprises a flip-flop having a clock input coupled to the input pulse signal, a data input coupled to said sync pulse output, and a Q output for providing the reset signal.

4. The demodulator of claim 1 in which the output means comprises a first flip-flop having a data input coupled to the input pulse signal, a clock input coupled to the strobe signal produced by the strobe means, and a Q output.

5. The demodulator of claim 4 in which the output means further comprises a second flip-flop having a data input coupled to the input pulse signal and a clock input coupled to the strobe signal of the strobe means, and having a Q output, the conditions of the Q outputs of the output means flip-flops defining sequences of digital code words produced by the output means.

6. The demodulator of claim 5 in which the output means further includes an inverter coupled between the strobe signal produced by the strobe means and the clock input of the second flip-flop in the output means.

7. The demodulator of claim 1 in which the plurality of pulse signal outputs of the counter include a first output at the carrier frequency, a second output at double the carrier frequency, and a third output at four times the carrier frequency.

8. The demodulator of claim 7 in which the strobe means further comprises a flip-flop, an inverter, and an AND gate, the flip-flop having a clock input coupled to the third counter output, a data input coupled through said inverter to the second counter output, and a Q output, the AND gate having a first input coupled to the Q output of said flip-flop, a second input coupled to the first counter output and having an output at which is produced said strobe signal.

9. A phase shift demodulator for demodulating an input pulse signal comprising pulses occurring at a given frequency, phase shift modulated with separated sequences of digital code words, comprising:

a clock-driven counter having a plurality of pulse signal outputs of differing frequencies, one of which corresponds substantially to said given frequency of the pulses of said input pulse signal;

means for synchronizing the pulse signal outputs of the counter with an unmodulated phase of the input pulse signal only at the beginning of each sequence of digital code words which modulate said given frequency of the pulses of said input pulse signal;

strobe means, coupled to said plurality of counter outputs, for producing a strobe signal for each word in each sequence of digital code words which modulate said given frequency of the pulses of said input pulse signal; and output means, coupled to the strobe signal and to the input pulse signal for producing sequences of demodulated digital code words based upon the condition of the input pulse signal when each said strobe is produced.

* * * * *